April 21, 1931. C. H. M. ROBERTS 1,802,090
PROCESS FOR BREAKING PETROLEUM EMULSIONS
Filed Jan. 24, 1927
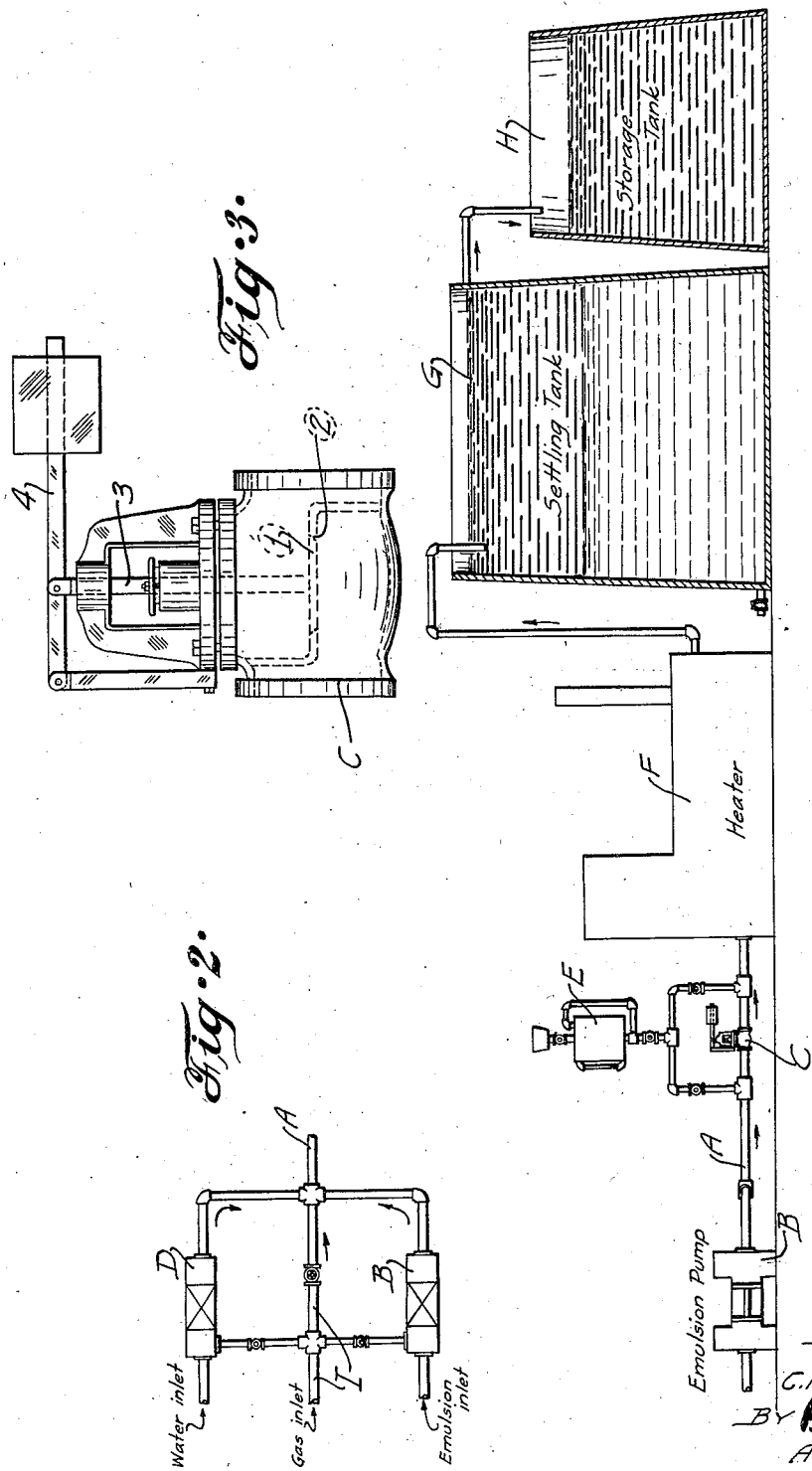

Patented Apr. 21, 1931

1,802,090

UNITED STATES PATENT OFFICE

CLAUDIUS H. M. ROBERTS, OF EL DORADO, ARKANSAS, ASSIGNOR, BY MESNE ASSIGNMENTS, TO TRETOLITE COMPANY, OF WEBSTER GROVES, MISSOURI, A CORPORATION OF MISSOURI

PROCESS FOR BREAKING PETROLEUM EMULSIONS

Application filed January 24, 1927. Serial No. 163,188.

This invention relates to processes of the kind that are used for breaking petroleum emulsions of the water-in-oil type, such as "cut oil", "roily oil", "emulsified oil", "B. S." and "tank bottoms".

One process that is now used for breaking such emulsions contemplates subjecting the emulsion to homogenization, with or without the addition of water, so as to facilitate the action of a medium or means that is relied upon to "break" the emulsion and which consists either of a chemical demulsifying agent that is added to the emulsion, or an electrical dehydrator, centrifuge or heating apparatus through which the emulsion is passed after the homogenizing operation.

I have discovered, in practising such a process, that better results are attained if an inert gaseous medium is incorporated in the emulsion prior to subjecting the emulsion to homogenization. Accordingly, the object of my present invention is to provide an improved process for breaking petroleum emulsions.

While I am not able to fully explain the reason why the emulsion will "break" more easily and effectively if it is subjected to such treatment prior to homogenization, I believe it is due to the fact that the inert gaseous medium which is incorporated in the emulsion imparts considerable compressibility to the mass and alters the physical characteristics of the oil, with the result that when the mass passes through the homogenizing device a sufficiently great pressure differential is attained to insure the water droplets of the emulsion being reduced greatly in diameter and also spaced relatively near together.

Any suitable inert gaseous medium may be used, such as compressed air at a temperature low enough to prevent oxidation of hydrocarbon material so that the compressed air is actually an inert gas, an inert gas under pressure, such as carbon dioxide gas, or the natural gases that occur in wells in which petroleum emulsions are produced, and various means can be used to incorporate said gaseous medium in the emulsion. I have herein illustrated an apparatus for practising my process that comprises a means for adding water or salt water to the emulsion, a homogenizing device consisting of a valve arranged in the line through which the emulsion flows, and a means for adding a chemical demulsifying agent to the emulsion, but I wish it to be understood that it is immaterial whether or not water or salt water is added to the emulsion, whether the homogenizing device consists of a valve, a colloidal mill, or other device, and whether a centrifuge, electrical dehydrator, heating apparatus or other means is used in place of a chemical demulsifying agent to "break" the emulsion or effect the separation of the component parts of the emulsion.

Figure 1 of the drawings is a side elevational view, partly in vertical section, illustrating an apparatus that can be used for practising my process.

Figure 2 is a top plan view of the portion of the apparatus comprising the pumps and the gas inlet means; and Figure 3 is a side elevational view of the homogenizing device.

Referring to the drawings which illustrate the said apparatus, A designates a flow line through which the emulsion is forced by a pump B that draws the emulsion from a source of supply, C designates a device for homogenizing the emulsion or subjecting it to intensive agitation of such a character as to simultaneously decrease the diameter of the water droplets and their distance apart and make said droplets of substantially uniform size, D designates a pump that can be used for adding water or salt water to the emulsion if the emulsion is of such a character that the treatment of same will be facilitated by the addition of water, E designates a device known commercially as a "Tret-o-lizer" that is used for adding a chemical demulsifying agent such, for example, as a water-softening agent or a modified fatty acid or the salt or ester thereof, to the emulsion so as to cause the emulsion to "break" when it is thereafter permitted to remain in a quiescent state, F designates a heater through which the emulsion is passed after the homogenizing operation, G designates a settling tank in which the emulsion is permitted to remain in a quiescent state so as to cause the emulsion to "break", and H designates a storage tank for receiving the good oil, and I designates a pipe leading from a source of gas supply that is used for introducing a gaseous medium into the flow line A at a point in advance of the homogenizing device C, so that a gaseous medium will be incorporated in the emulsion before the emulsion is subjected to the homogenizing operation.

Any suitable kind of a homogenizing device can be used, the device C herein shown consisting of a valve provided with a tapered valve member 1 arranged with its peripheral edge spaced slightly away from a tapered valve seat 2, a stem 3 attached to said valve member 1 and a weighted lever 4 that acts on said stem and holds the valve member 1 in sufficiently close proximity to its seat to produce an orifice of such restricted area that the emulsion will be subjected to intensive agitation and the gaseous medium in the emulsion will be compressed and thereafter expanded when the mass passes through said orifice, thereby causing the size of the water droplets to be reduced and said water droplets spaced relatively near together. In the apparatus herein illustrated the "Tret-o-lizer" E or other means that is used to add or introduce the chemical demulsifying agent into the flow line A is arranged in the flow line at a point beyond the homogenizing device C, but if desired, the device E can be arranged in the flow line at a point in advance of the homogenizing device. The pipe I that introduces the gas or gaseous medium into the flow line can lead from any suitable source of supply, the terms "gas" or "gaseous medium", as herein used, meaning a substance which exists in the gaseous state under ordinary temperature and pressure.

In practising my process I prefer to introduce a gaseous medium of the kind previously mentioned into the flow line A through a supply pipe I, said gaseous medium becoming incorporated in the emulsion before the emulsion reaches the homogenizing device C. In passing through the restricted orifice of said homogenizing device said gaseous medium will become compressed and thereafter expanded, thus producing voids in the mass which permit the water droplets to separate and tend to remain separated or out of contact with each other.

If the emulsion is of such a character that the treatment of same will be facilitated by the addition of water, then water or salt water is introduced into the flow line A by the pump D at a point in advance of the homogenizing device C. The volume of water so employed will vary with the character of the emulsion being treated, but in a general way will be equivalent to about 20% to 50% of the volume of emulsion with which it is incorporated, although in some instances less water might be advantageously employed and at times as much as an equal volume of water and emulsion can be handled most effectively, so as to give the most economical demulsifying effect.

A suitable chemical demulsifying agent, preferably a modified castor oil body, is introduced into the flow line A either before or after the emulsion has passed through the homogenizing device, it being preferable to introduce the demulsifying agent into the flow line at a point in advance of the homogenizing device C, so as to insure the demulsifying agent being distributed uniformly through the emulsion, due to the homogenizing action to which the emulsion is subjected. The treated emulsion is thereafter passed through a heater F, which is usually maintained at a temperature varying from 120° F. to 190° F. Subsequently, the emulsion is introduced into a settling tank G, wherein it is permitted to remain in a quiescent state, with the result that the emulsion will break or separate into its component parts, the clean oil being thereafter discharged from the settling tank G into the storage tank H, as indicated in Figure 1 of the drawings.

Having thus described my invention, what I claim as new and desire to secure by Letters Patent is:

1. A process for breaking petroleum emulsions, characterized by incorporating an inert gaseous medium in the emulsion, and thereafter subjecting the emulsion to homogenization and to the action of a demulsifying means.

2. A process for breaking a petroleum emulsion, characterized by incorporating an inert gaseous medium in the emulsion, adding water to the emulsion, then homogenizing the mixture, and finally subjecting the emulsion to the action of a demulsifying means.

3. A process for breaking a petroleum emulsion, characterized by introducing an inert gaseous medium into a flow line through which an emulsion is traveling, causing the emulsion to thereafter pass through a homogenizing device in said flow line, and subsequently subjecting the emulsion to the action of a demulsifying medium.

4. A process for breaking a petroleum emulsion, characterized by incorporating an inert gaseous medium in the emulsion, then subjecting the emulsion to homogenization, and thereafter adding a chemical demulsifying agent to the emulsion.

5. A process for breaking a petroleum emulsion, characterized by incorporating an inert gaseous medium in the emulsion, adding water to the emulsion, subsequently subjecting said mixture to a homogenizing operation, and thereafter adding a chemical demulsifying agent to the emulsion.

6. A process for breaking a petroleum emulsion, characterized by injecting an inert gaseous medium into a flow line through which an emulsion is traveling, causing the emulsion to pass through a homogenizing device in the flow line arranged at a point beyond the point where the inert gaseous medium was introduced into the flow line, introducing a chemical demulsifying agent into the flow line at a point beyond the point where the homogenizing device is located, and finally introducing the treated emulsion into a settling tank wherein it is permitted to remain in a quiescent state.

7. A process for breaking a petroleum emulsion, characterized by pumping an emulsion through a flow line, introducing an inert gaseous medium into said flow line, adding water to the emulsion, passing the emulsion through a homogenizing device after the inert gaseous medium has been incorporated in the emulsion, subsequently adding a chemical demulsifying agent to the emulsion while it is traveling through the flow line, and finally introducing the emulsion into a settling tank.

8. In a process for breaking petroleum emulsions, the step of incorporating an inert gaseous medium in the emulsion prior to treating the emulsion to effect the breaking of same and then homogenizing the mixture.

CLAUDIUS H. M. ROBERTS.